Figure 1A:
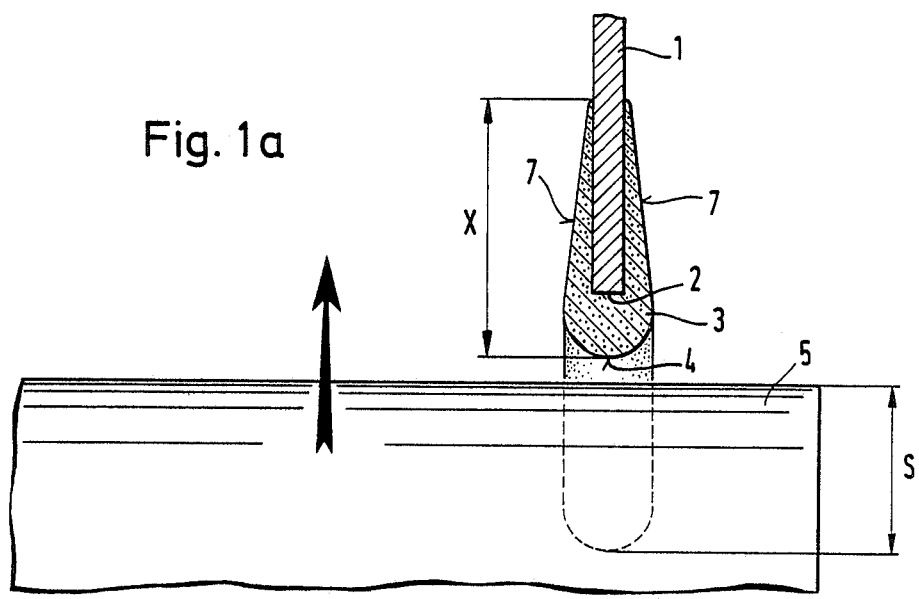

United States Patent [19]
Brehm et al.

[11] Patent Number: 4,811,722
[45] Date of Patent: Mar. 14, 1989

[54] PROCESS FOR SHARPENING CUTTING-OFF TOOLS AND CUTTING-OFF PROCESS

[75] Inventors: Gerhard Brehm, Emmerting; Johann Niedermeier, Burghausen, both of Fed. Rep. of Germany

[73] Assignee: Wacker Chemitronics GmbH, Munich, Fed. Rep. of Germany

[21] Appl. No.: 190,496

[22] Filed: May 5, 1988

[30] Foreign Application Priority Data

Jun. 5, 1987 [DE] Fed. Rep. of Germany ....... 3718947

[51] Int. Cl.$^4$ ............................................. B24B 53/00
[52] U.S. Cl. ............................ 125/11 R; 125/11 DG; 125/11 M; 51/5 D
[58] Field of Search .......... 125/11 R, 11 DG, 11 NT, 125/11 M, 13 R, 14; 51/5 D

[56] References Cited

U.S. PATENT DOCUMENTS 4,501,258  2/1985  Dyer et al. .

FOREIGN PATENT DOCUMENTS 1931891  1/1971  Fed. Rep. of Germany .
2359096  6/1975  Fed. Rep. of Germany .
3640645  11/1986 Fed. Rep. of Germany .
1465717  3/1977  United Kingdom .

Primary Examiner—Frederick R. Schmidt
Assistant Examiner—Maurina Rachuba
Attorney, Agent, or Firm—Burgess, Ryan & Wayne

[57] ABSTRACT

Cutting-off tools whose cutting edge has a cutting layer with a bonded cutting grain are sharpened by sawing momentarily into a solid sharpening substance, in which case, in addition to a relative movement between cutting edge and solid material corresponding to the sawing operation, an oscillating relative movement transversely thereto is also performed. The process is used with particular advantage in combination with processes for the centerhole sawing of semiconductor or oxidic material.

6 Claims, 1 Drawing Sheet

PROCESS FOR SHARPENING CUTTING-OFF TOOLS AND CUTTING-OFF PROCESS

The invention relates to a process for sharpening cutting-off tools having a cutting layer which is applied to the cutting edge and has a bonded cutting grain for cutting off slices or wafers from bar-shaped or block-shaped workpieces and particularly those made of a semiconductor material, by momentarily sawing into a solid substance. The invention also comprises a cutting-off process.

Inner hole saws are preferably used for cutting off slices or wafers of typically 0.1 to 1 mm slice thickness from bar-shaped or block-shaped workpieces, in particular workpieces made of semiconductor materials such as silicon, germanium or gallium arsenide, or oxidic material such as gallium gadolinium garnet, ruby or fused quartz. The saw blades used in these saws have at their center a circular hole whose inner edge, provided with a cutting layer having a bonded cutting grain, removes the material during the cutting-off operation. In many cases, this cutting edge consists, for example, of a nickel coating which has diamond grains bonded therein, surrounds the inner margin of the saw blade and has, for example, a drop-shaped cross section.

Cutting layers of this type with a bonded grain are also used in outer cutting-off saws having a circular saw blade or in band saws, although these saws have not gained any importance comparable to the centerhole saws or internal hole saws, at least in the field of semiconductors. In all these saw types, the cutting edge wears in the course of the sawing operation which finally results in it no longer being possible to keep to the nominal cutting line. During the centerhole sawing of semiconductor slices or wafers, where an especially high geometric precision is important, it will be noticed, for example, that the geometry of the slices or wafers obtained distinctly changes in the course of a series of cuts.

In DE-No.-B2-2,359,096, it is therefore proposed that when a certain bending tolerance of the slices is exceeded, to resharpen the saw blade by momentarily sawing into a hard material which knocks out exposed diamond grains. As a rule, the cutting result subsequently improves at least for some sawing operation. From experience, however, as time in service of the saw blade increases, the requisite sharpening intervals become shorter and shorter until finally even repeated resharpening brings no improvement. In this case, the saw blade has to be replaced, which not only increases material costs but also increase idle time required for fitting and dismantling the apparatus. Thus, more stringent requirements are imposed on the geometric quality of the slices or wafers and this inevitably leads to reduced time in service of the saw blades together with the disadvantages associated therewith.

The object of the invention is to provide a process for sharpening cutting-off tools and a cutting-off process which makes it possible to increase the time in service and improve the cutting precision to meet stringent requirements imposed on the geometric quality of semiconductor slices.

The object is achieved by a process wherein, during sharpening, in addition to a relative movement between cutting edge and solid substance corresponding to the sawing operation, an oscillating relative movement transversely thereto between the cutting edge and the solid sharpening substance is performed.

A suitable solid sharpening substance comprises the materials commonly used in sharpening technology as, for example, the so-called "oilstones" which usually contain aluminum oxide or silicon carbide powder as an abrasive which is bonded into a backing material on a ceramic or plastic base.

In the process, the relative movement between cutting edge and solid sharpening substance, which corresponds to the relative movement between cutting edge and workpiece taking place during the actual sawing operation, is preferably performed at least at the feed rate maintained during the sawing operation. Commonly used feed rates, which of course greatly depend on the material to be sawn and cutting-off tool, typically lie in the range of about 10 to 100 mm/min, for example in the centerhole sawing of semiconductor slices or wafers made, for example, of silicon.

The sharpening step is preferably carried in the solid sharpening substance at least as far as depth of cut which ensures that the widest point of the cutting layer is located inside the solid substance. In most cases, it is not necessary to have the cutting layer penetrate over its entire length into the solid substance, although such a procedure can be used. For example, in the centerhole saws or internal hole saws which are frequently used for cutting off semiconductor slices or wafers and whose saw blades are typically provided with a cutting layer usually about 2 mm high having a drop-shaped cross section of diamond grains bonded in a nickel coating, a depth of cut of about 50 to 100% of the overall height of the cutting layer, that is about 1 to 2 mm, preferably about 1.3 to 1.8 mm, has proved successful in the sharpening process.

When the relative movement during the sharpening between cutting edge and solid sharpening substance, corresponding to the actual sawing operation, has reached the intended depth of cut, there is performed according to the invention, an oscillating relative movement transversely thereto between the cutting edge and the solid sharpening substance. Preferably, the oscillating movement is done in such a way that the position of the rotating saw blade is kept stationary and the solid substance is moved. In principle, it is possible to move the solid substance against one lateral surface of the cutting layer by pressure or tension during a complete rotation of the saw blade and against the other lateral surface during a following complete rotation. However, better results are obtained if a plurality of oscillations of the solid substance are performed during a plurality of preferably at least five revolutions of the saw blade and thus of the cutting edge.

The transverse, oscillating relative movement are preferably performed in such a way that the maximum speed at which the solid substance is moved toward the lateral surfaces of the saw blade at the same time corresponds at least to the peripheral speed of the cutting edge. Such peripheral speeds lie in the range of about 10 to 30 m/sec, for example, at centerhole diameters of about 18 cm, which are commonly used for the centerhole sawing of silicon bars of about 10 cm diameter. However, these values can of course vary within wide limits as a function of the particular saw-blade and workpice dimensions.

Another way to provide the osciallating relative movement, instead of performing a reciprocating movement with the solid substance, is to perform a pivoting movement about an axis of rotation whose center is the center of the width of the saw blade at the midpoint of the penetration of the saw blade into the solid sharpening substance. This variant has the advantage that unidirectional loads on the cutting edge are avoided.

In most cases, it is sufficient, during the oscillation, for the movement of the solid substance relative to the rotating saw blade or the moving cutting layer to be about 0.1 to 1 mm.

Although the two steps corresponding to the different relative movements are generally performed in sequence during the sharpening process, it is possible to have them occur simultaneously. In this case, the saw blade is sharpened by sawing into an oscillating solid substance.

The process according to the invention is described in greater detail below with reference to FIGS. 1a and 1b in which the relative movement between cutting layer and solid substance are shown schematically. In both FIGS., individual parts corresponding to each other are provided with the same reference numerals.

According to FIG. 1a, the saw blade 1, for example a centerhole saw or internal hole saw, is surrounded at its inner edge 2 by a cutting layer 3, for example a nickel/-diamond coating with, for example, a drop-shaped cross section. A solid sharpening substance 5, for example, an approximately finger-thick cylinder of corundum grains embedded in a ceramic material, is moved up to the cutting edge 4 in a relative movement (arrow direction) corresponding to the sawing operation. During this procedure, the solid sharpening substance 5 is cut into until the depth S of the cut is approximately ⅔ of the height X of the cutting layer.

Figure 1B:
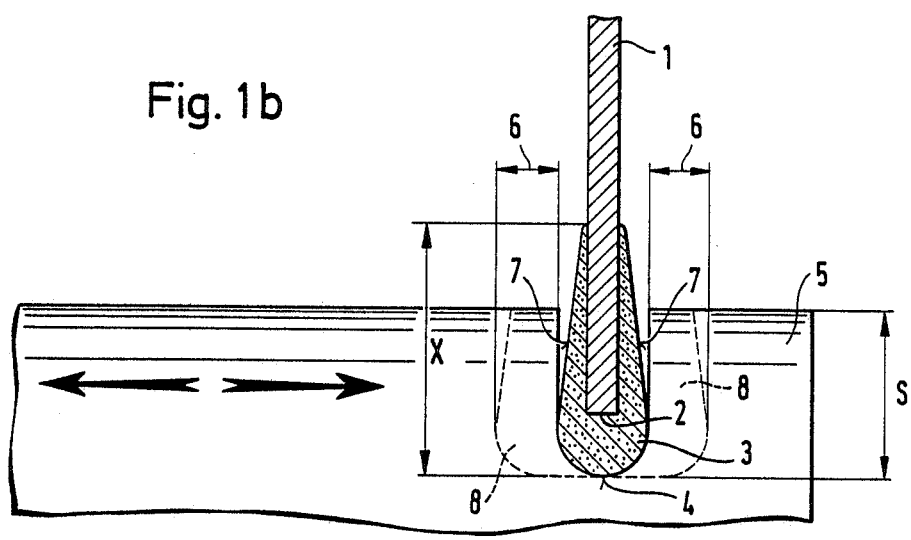

Accordingly to FIG. 1b, the hard material 5 is now oscillated (arrow direction) transversely to the direction of the sawing operation with the deflection 6 from the original position (cf. FIG. 1a). During this procedure, the flanks 7 of the cutting layer also come in contact with the solid substance 5, in which the recess 8, indicated by broken lines, is finally made.

It is possible to produce the necessary relative movements by moving the saw blade 1 with the solid sharpening substance 5 being stationary, but this variant requires considerably greater effort.

The process described here is generally useful for sharpening cutting-off tools in which the cutting edge is formed by a cutting layer having a bonded cutting grain. For example, the method is useful for sharpening cutting-off saws having the cutting edge on the external periphery, band saws or centerhole saws or internal hole saws. It is used with particular advantage in the precision cutting-off of slices or wafers of about 0.1 to 10 mm thickness from bars or blocks of semiconductor or oxidic material such as silicon, germanium, gallium arsenide or gallium gadolinium garnet in which a particularly high geometric precision is often demanded, in particular with regard to the bending of the slices or wafers usually termed bow or warp.

Here, the actual sawing operation can be carried out in the conventional way as, for example, by slices or wafers being cut off and removed slice by slice or wafer by wfaer from a silicon bar or by the bar being divided into a plurality of slices or wafes connected together and this connection later broken, the latter process also being carried out with multiblade centerhole saws.

If, during the sawing operation, the deflection of the saw blade from the desired cutting line, which results from the non-uniform stressing of the cutting edge, exceeds a certain tolerance value established beforehand, the cutting edge of the rotating saw blade is sharpened in the manner described above before the next cut. The deflection of the saw blade can be established, for example, on the saw blade itself by means of measuring probes during cutting or subsequently by measuring the geometry of the slices or wafers obtained.

Another procedure is to carry out the sharpening step periodically after a predetermined number of cuts, as a rule about 10 to about 100. This procedure is preferred in an automatic sawing process.

The sharpening operation itself can also proceed automatically, for example by the solid sharpening substance located in a movable mounting being moved by means of stepping motors into the sharpening position for performing the sawing and oscillating movement. A hand-operated device, for example, having an oscillating mounting for the solid substance, in which the sawing movement is effected manually but the oscillating movement is motor-driven, is useful. In general, the use of a transportable device has the advantage that not every sawing unit has to be provided with a separate sharpening attachment.

The sharpening process according to the invention is used with particular advantage in combination with a centerhole sawing process in which the progress of the cut is enchanced during the actual sawing operation by a fluid applied at least from time to time to one or both lateral surfaces of the rotating saw blade before entry into the sawing gap. This process is described in German Patent Specification reference No. P 3,640,645.7, applied for on Nov. 28, 1986.

In particular, when it is used in combination with this sawing process, the sharpening process according to the invention enables clearly prolonged service times of the cutting blade to be reached in conjunction with an improved cutting accuracy and thus high geometric quality of the slices obtained.

The invention is described in greater detail with reference to the exemplary embodiment below:

COMPARATIVE EXAMPLE

In a conventional centerhole saw, single-crystalline silicon bars (diameter about 10 cm) were sawn into slices of about 650 um thickness under the normal sawing conditions. The saw blade had an outside diameter of about 55 cm and a centerhole diameter of abou 18 cm. The inner edge was provided with an approximately 2 mm high nickel coating, into which diamond grains were randomly bonded, and rotated at a speed of about 18 m/sec. The workpiece feed was set to a rate of about 6 cm/min. During the sawing operation, the deflection of the saw blade from the ideal cutting line was monitored by means of a microsensor. If this deflection, from which the geometric precision of the slices obtained can be inferred, exceeded a value of ±10 um relative to the intended progress of the cut; the saw blade was resharpened before the next sawing operation by the sharpening being carried out for about 7 sec. in a cylindrical body of ceramically bonded silicon carbide powder (diameter about 2 cm).

On average, the saw blade had to be resharpened after every 8th sawing operation. (Initially, there were up to 10 sawing operations between resharpening, but the intervals between resharpening kept on decreasing until toward the end of the time in service of the saw blade, resharpening had to be carried out after every sawing operation). After about 700 cuts, the saw blade, despite repeated sharpening, could not longer be kept within the intended tolerance limit and had to be replaced.

EXAMPLE

In the saw in accordance with the comparative example, silicon bars of the same specification were sawn with a new saw blade in exactly the same way.

During resharpening, however, the sharpening cylinder of the ceramically bonded silicon carbide powder was moved by means of a sharpening apparatus and a stepping motor in each case at a speed of about 6 cm/min against the cutting edge until the latter had worked into it to a depth of about 1.5 mm. Then, by means of a second stepping motor, the cylinder was set to oscillation transversely to the first movement, which oscillation deflected it about ±0.5 mm from the steady position and moved it against the saw blade in each case at a maximum speed of 20 m/sec. This oscillation was maintained for about 1 sec in each case.

In this sharpening process, the cutting edge had to be resharpened every 40 cuts on average. Only after 3000 cuts was it no longer to possible to keep the saw blade within the specified tolerance limit, so that it had to be replaced.

What is claimed is:

1. In a process for sharpening a cut-off tool for cutting off slices or wafers from work-pieces, the cut-off tool having a cutting layer which is applied to the cutting edge and has a bonded cutting grain, wherein the cut-off tool is sharpened by sawing into a solid sharpening substance, the improvement which comprises: during the sharpening, providing an oscillating movement, transverse to the cutting edge, between the cutting edge and the solid sharpening substance, during the period in which the cutting layer of the cutting edge penetrates into the solid sharpening substance.

2. The process as claimed in claim 1, wherein the relative movement between cutting edge and solid sharpening substance, corresponding to the sawing operation, is performed at least at the feed rate maintained during the actual sawing operation.

3. The process as claimed in claim 1 wherein the transverse oscillating movement is performed at a maximum speed corresponding to a peripheral speed of the cutting edge.

4. The process as claimed in claim 1, wherein the transverse oscillating relative movement is performed for at least five revolutions of the cutting edge.

5. The process as claimed in claim 1, wherein the deflection of the solid sharpening substance is about 0.1 to 1 mm during the transverse oscillating movement.

6. The process as claimed in claim 1, wherein the cutting edge saws into the solid sharpening material to a depth of cut at which at least the widest point of the cutting layer is located inside the solid sharpening substance.

* * * * *